(12) United States Patent
Chang et al.

(10) Patent No.: US 9,325,004 B2
(45) Date of Patent: Apr. 26, 2016

(54) CATHODE ACTIVE MATERIAL, AND CATHODE AND MAGNESIUM SECONDARY BATTERY INCLUDING THE CATHODE ACTIVE MATERIAL

(71) Applicant: Samsung Electronics Co., Ltd., Suwon-si, Gyeonggi-do (KR)

(72) Inventors: Won-seok Chang, Namyangju-si (KR); Seok-soo Lee, Yongin-si (KR); Ju-sik Kim, Seoul (KR); Jae-myung Lee, Seoul (KR); Dong-wook Han, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 191 days.

(21) Appl. No.: 14/149,986

(22) Filed: Jan. 8, 2014

(65) Prior Publication Data

US 2015/0086859 A1 Mar. 26, 2015

(30) Foreign Application Priority Data

Sep. 23, 2013 (KR) .................. 10-2013-0112868

(51) Int. Cl.
*H01M 4/485* (2010.01)
*H01M 4/505* (2010.01)
*H01M 10/054* (2010.01)
*H01M 4/525* (2010.01)

(52) U.S. Cl.
CPC .............. *H01M 4/485* (2013.01); *H01M 4/505* (2013.01); *H01M 4/525* (2013.01); *H01M 10/054* (2013.01)

(58) Field of Classification Search
None
See application file for complete search history.

(56) References Cited

U.S. PATENT DOCUMENTS

| | | | |
|---|---|---|---|
| 6,316,141 B1 | 11/2001 | Aurbach et al. | |
| 6,337,160 B1 | 1/2002 | Hilarius et al. | |
| 6,585,881 B2 | 7/2003 | Davis et al. | |
| 7,081,235 B2 * | 7/2006 | Feddrix ................. | B82Y 30/00 252/519.1 |
| 2003/0215712 A1 | 11/2003 | Feddrix et al. | |
| 2004/0214086 A1 | 10/2004 | Bruce et al. | |
| 2011/0262804 A1 | 10/2011 | Muldoon et al. | |
| 2013/0196236 A1 * | 8/2013 | Jung ................... | H01M 4/0438 429/338 |
| 2013/0209894 A1 | 8/2013 | Ryu et al. | |
| 2014/0178773 A1 | 6/2014 | Ryu et al. | |

FOREIGN PATENT DOCUMENTS

| | | |
|---|---|---|
| CN | 101320806 A | 12/2008 |
| JP | 2001-076721 A | 3/2001 |
| KR | 1020140008104 A | 1/2014 |
| KR | 1020140081507 A | 7/2014 |
| WO | 2011150093 A1 | 12/2011 |

OTHER PUBLICATIONS

Zhang et al., "a-MnO2 as a cathode material for rechargeable Mg batteries", Eletrochemistry Communications, vol. 23, 2012, pp. 110-113.

* cited by examiner

*Primary Examiner* — Jonathan Crepeau
(74) *Attorney, Agent, or Firm* — Cantor Colburn LLP

(57) ABSTRACT

A cathode active material for a magnesium secondary battery, the cathode active material including a composite transition metal oxide which is expressed by Chemical Formula 1 and intercalates and deintercalates magnesium:

$Mg_xMa_{1-y}Mb_yO_{2+d}$   Chemical Formula 1 wherein $0 \leq x \leq 1$, $0.05 \leq y < 0.5$, and $-0.3 \leq d < 1$, and Ma and Mb are each independently a metal selected from the group consisting of Groups 5 to 12 of the Periodic Table.

18 Claims, 5 Drawing Sheets

CATHODE ACTIVE MATERIAL, AND CATHODE AND MAGNESIUM SECONDARY BATTERY INCLUDING THE CATHODE ACTIVE MATERIAL

RELATED APPLICATIONS

This application claims priority to and the benefit of Korean Patent Application No. 10-2013-0112868, filed on Sep. 23, 2013 in the Korean Intellectual Property Office, and all the benefits accruing therefrom under 35 U.S.C. §119, the content of which is incorporated herein in its entirety by reference.

BACKGROUND

1. Field

The present disclosure relates to a cathode active material, and a cathode and a magnesium secondary battery including the cathode active material.

2. Description of the Related Art

In line with the development of lightweight and high-performance portable electronic devices, such as video cameras, mobile phones, and notebook PCs, research into high capacity and high energy density batteries that are used as power sources for driving these electronic devices has been conducted.

Lithium batteries are being widely used commercially because they provide rapid charging and because their energy density is about three times greater than that of lead storage batteries, nickel-cadmium batteries, nickel-metal hydride batteries, and nickel zinc batteries.

Lithium batteries may be prepared by including a carbon anode that may intercalate/deintercalate lithium ions, a lithium-containing oxide cathode, and a non-aqueous electrolyte solution, in which an appropriate amount of a lithium salt is dissolved in a mixed organic solvent, in a battery case.

Lithium batteries may have safety limitations due to a side reaction of the electrolyte solution and the high reactivity of lithium. Also, elemental lithium is expensive.

Since magnesium batteries are eco-friendly and have excellent cost competitiveness and energy storage characteristics in comparison to lithium batteries, research into developing magnesium batteries as medium and large-sized batteries for power storage and electric vehicles has been actively conducted.

In available magnesium batteries, a metal oxide-based cathode active material, such as $MnO_2$, has poor lifetime characteristics.

Therefore, there is still a need to develop a cathode active material that may provide a magnesium battery having improved lifetime characteristics.

SUMMARY

Provided is a cathode active material for a magnesium battery in which structural stability is improved by substituting the cathode active material with a transition metal.

Provided is a cathode including the cathode active material.

Provided is a magnesium battery including the cathode.

Additional aspects will be set forth in part in the description which follows and, in part, will be apparent from the description.

According to an aspect, a cathode active material for a magnesium secondary battery includes a composite transition metal oxide which is expressed by Chemical Formula 1 and intercalates and deintercalates magnesium:

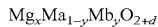

$$Mg_xMa_{1-y}Mb_yO_{2+d} \qquad \text{Chemical Formula 1}$$

wherein $0 \le x \le 1$, $0.05 \le y < 0.5$, and $-0.3 \le d < 1$, and Ma and Mb are each independently a metal selected from the group consisting of Groups 5 to 12 of the Periodic Table.

According to another aspect, a cathode for a magnesium secondary battery includes the cathode active material.

According to another aspect, a magnesium secondary battery includes the cathode; an anode; and an electrolyte including magnesium.

Also disclosed is a method of preparing a cathode active material for a magnesium secondary battery, the method including: preparing a first aqueous solution including a first precursor of a first Group 5 to 12 metal; preparing a second aqueous solution including an oxidant and a second precursor of a second Group 5 to 12 metal; combining the first and second solutions to form a precipitate; and heat-treating the precipitate to form the cathode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
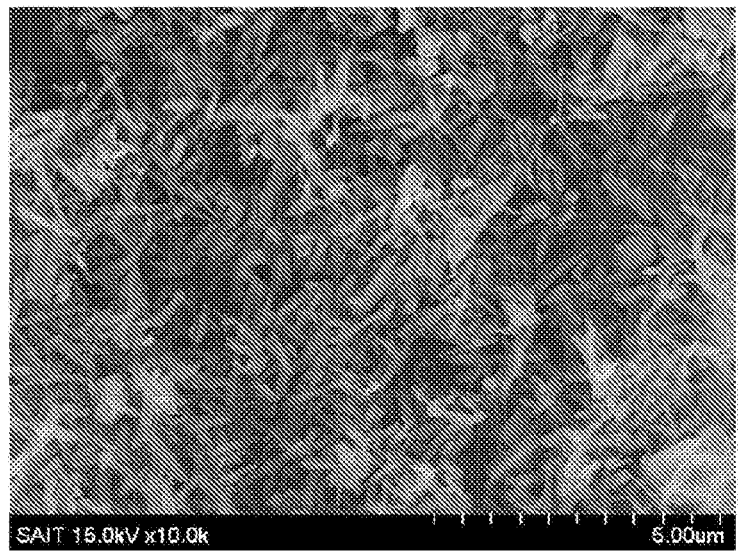
FIG. 1A is a scanning electron microscope (SEM) image of a cathode active material prepared in Comparative Example 1.
Figure 1B:
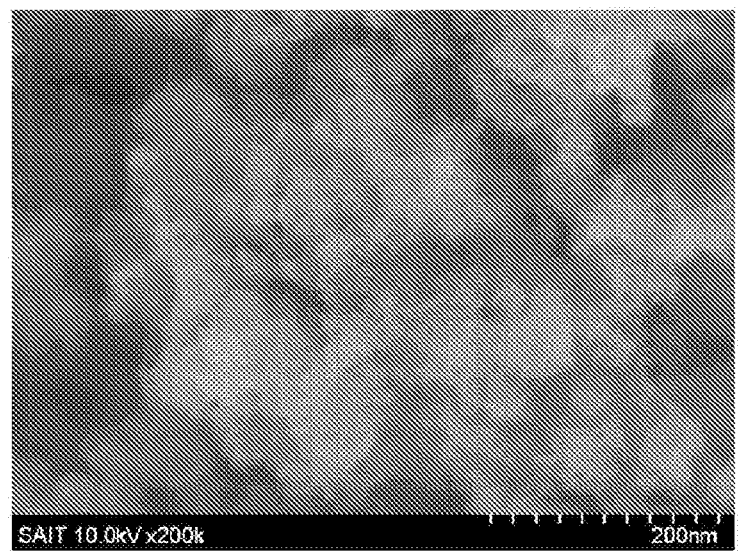
FIG. 1B is an SEM image of a cathode active material prepared in Example 1.
Figure 1C:
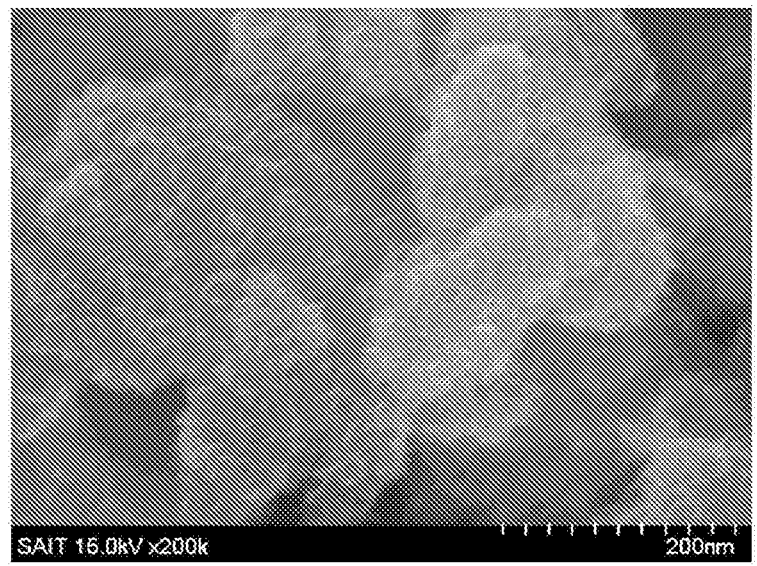
FIG. 1C is an SEM image of a cathode active material prepared in Example 2.
Figure 1D:
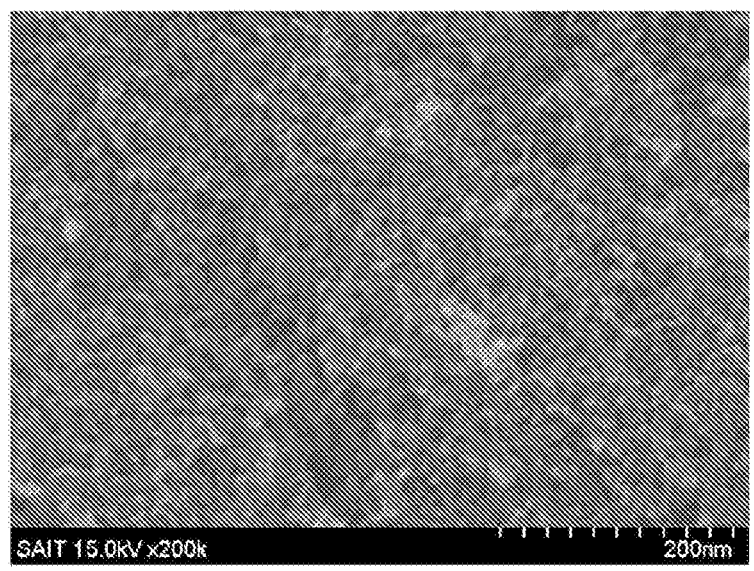
FIG. 1D is an SEM image of a cathode active material prepared in Example 3.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or."

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an embodiment of a cathode active material for a magnesium secondary battery, and a cathode and a magnesium secondary battery including the cathode active material will be disclosed in more detail. A magnesium battery denotes a magnesium secondary battery unless it is indicated otherwise.

The cathode active material for a magnesium secondary battery comprises a composite transition metal oxide which is expressed by Chemical Formula 1 and intercalates and deintercalates magnesium:

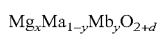  Chemical Formula 1 wherein $0 \leq x \leq 1$, $0.05 \leq y < 0.5$, and $-0.3 \leq d < 1$, and Ma and Mb are each independently a metal of Groups 5 to 12 of the Periodic Table. For example, in Chemical Formula 1, $0.1 \leq x < 7$, $0.1 \leq y < 0.5$, or $-0.3 \leq d < 0.5$. For example, in Chemical Formula 1, $0.1 \leq x < 6$, $0.1 \leq y < 0.4$, or $-0.3 \leq d \leq 0$, or $0.2 \leq x < 6$, $0.2 \leq y < 0.4$, or $-0.2 \leq d < 0.4$, or $0.4 \leq x < 5$, $0.1 \leq y < 0.5$, or $0 \leq d < 0.5$.

In the composite transition metal oxide, and while not wanting to be bound by theory, it is believed that because the transition metal oxide including Ma is substituted with the transition metal Mb in an amount of about 5 mol % to less than about 50 mol %, based on a total content of Ma, the transition metal Mb may act as a pillar which supports a crystal structure of the composite transition metal oxide during the intercalation and deintercalation of magnesium (Mg) ions during charge and discharge processes of the magnesium secondary battery, and thus, the collapse or destruction of the crystal structure of the composite transition metal oxide may be prevented. Therefore, since the structural stability of the composite transition metal oxide may be improved, lifetime characteristics of the magnesium battery including the cathode active material may be improved. In an embodiment, 5 to 50 mol %, specifically 10 to 40 mol %, more specifically 20 to 30 mol % of Ma in Chemical Formula 1 is substituted by Mb.

When the amount of the transition metal Mb in the composite transition metal oxide is less than about 5 mol % (e.g., y is less than about 0.05 in Chemical Formula 1), the Mb may not substitute for the Ma and may be simply doped as an impurity. Thus, the performance of the cathode active material may be degraded. When the amount of the Mb in the composite transition metal oxide is greater than about 50 mol % (e.g., y is greater than about 0.5 in Chemical Formula 1), initial capacity may be decreased.

Ionic radii of the Ma and the Mb may be different in the cathode active material. For example, the structural stability of the composite transition metal oxide may be improved by being substituted with the Mb having an ionic radius larger than that of the Ma.

For example, in the cathode active material, an ionic radius of an $Ma^{+4}$ ion may be smaller than an ionic radius of an $Mb^{+3}$ ion. For example, the ionic radius of the $Ma^{+4}$ ion may be smaller than an ionic radius of an $Mb^{+2}$ ion. Since the divalent and/or trivalent Mb ions have an ionic radius larger than that of the $Ma^{+4}$ ions for which they substitute in the cathode active material, the divalent and/or tetravalent Mb ions may act as a pillar that supports the crystal structure of the composite transition metal oxide. Thus, the structural stability of the composite transition metal oxide may be improved during the charge and discharge processes.

The ionic radius of the $Ma^{+4}$ ion in the cathode active material may be in a range of about 0.050 nanometer (nm) to about 0.060 nm. The ionic radius of the $Mb^{+2}$ ion in the cathode active material may be greater than about 0.060 nm. For example, the ionic radius of the $Mb^{+2}$ ion in the cathode active material may be in a range of about 0.061 nm to about 0.085 nm. The ionic radius of the $Mb^{+3}$ ion in the cathode active material may be greater than about 0.060 nm. For example, the ionic radius of the $Mb^{+3}$ ion in the cathode active material may be in a range of about 0.061 nm to about 0.070 nm.

In the cathode active material, the Ma and the Mb may be each independently be oxidized or reduced during charge and discharge so that oxidation numbers thereof may be changed. That is, in the charge and discharge processes, the Ma and the Mb may be simultaneously involved in redox reactions. Since the Ma and the Mb may be simultaneously involved in the charge and discharge processes, the dissolution of the Ma may be prevented due to excessive oxidation of the Ma.

At least a portion of the composite transition metal oxide in the cathode active material may have a pyrolusite-type crystal structure. For example, the composite transition metal oxide is partially substituted with Mb and thus, sites not substituted with Mb may have the pyrolusite-type crystal structure.

Figure 2:
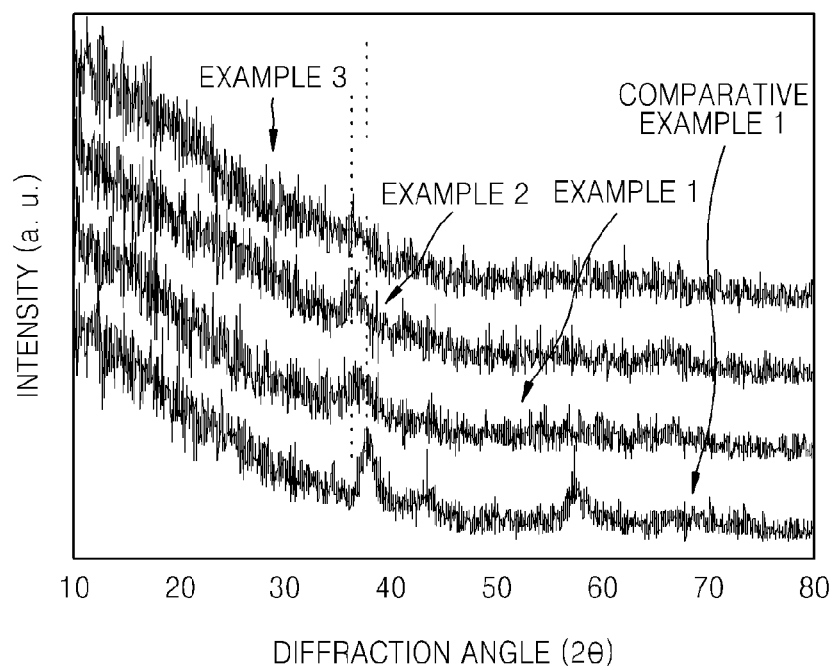
FIG. 2 is a graph of intensity (arbitrary units, a.u.) versus scattering angle (degrees two-theta (2θ)) which shows X-ray diffraction (XRD) spectra of the cathode active materials prepared in Examples 1 to 3 and Comparative Example 1.

The composite transition metal oxide in the cathode active material may have a degree of crystallinity less than that of the transition metal oxide that comprises Ma and is not substituted with Mb. Since the distance between the Ma and surrounding atoms may vary due to the substitution of Mb, the regularity of the crystal structure may be decreased. That is, in the cathode active material, the composite transition metal oxide may have a structure close to an amorphous structure in comparison to the transition metal oxide that comprises Ma and is not substituted with Mb. As illustrated in FIG. 2, intensities of characteristic peaks representing crystallinity of Examples that are subjected to the substitution of Mb were decreased in comparison to the Comparative Example.

In the cathode active material, the Mb may have higher electrical conductivity than that of the Ma. Therefore, the electrical conductivity of the composite transition metal oxide may be improved by substituting the transition metal oxide with Mb, which has a higher electrical conductivity than the Ma. Since the resistance of the cathode active material may be decreased by the improvement of the electrical conductivity of the composite transition metal oxide, an overvoltage may decrease during the charge and discharge of the magnesium battery and the reversibility of an electrode reaction may be improved. As a result, the lifetime characteristics of the magnesium battery may be improved by inclusion of Mb.

The composite transition metal oxide in the cathode active material may be a composite manganese oxide expressed by Chemical Formula 2.

$$Mg_xMn_{1-y}Mb_yO_{2+d} \quad \text{Chemical Formula 2}$$

wherein $0 \leq x \leq 1$, $0.05 \leq y < 0.5$, and $-0.3 \leq d < 1$, and Mb may be a metal of Groups 5 to 12 of the Periodic Table, other than manganese (Mn). For example, in Chemical Formula 2, $0.1 \leq x < 0.7$, $0.1 \leq y < 0.5$, or $-0.3 \leq d < 1$. For example, in Chemical Formula 2, $0.1 \leq x < 0.6$, $0.1 \leq y < 0.4$, or $-0.3 \leq d < 0.5$.

The composite transition metal oxide in the cathode active material may be a composite manganese oxide expressed by Chemical Formula 3.

$$Mg_xMn_{1-y}Mc_yO_{2+d} \quad \text{Chemical Formula 3}$$

wherein $0 \leq x \leq 1$, $0.05 \leq y < 0.5$, and $-0.3 \leq d < 1$, and Mc may be a metal of iron (Fe), cobalt (Co), nickel (Ni), zinc (Zn), or vanadium (V). For example, in Chemical Formula 3, $0.1 \leq x < 0.7$, $0.1 \leq y < 0.5$, or $-0.3 \leq d < 0.5$. For example, in Chemical Formula 3, $0.1 \leq x < 0.6$, $0.1 \leq y < 0.4$, or $-0.3 \leq d \leq 0.4$ The composite transition metal oxide in the cathode active material may be a composite manganese oxide expressed by Chemical Formula 4.

$$Mn_{1-y}Mc_yO_{2+d} \quad \text{Chemical Formula 4}$$

wherein $0.05 \leq y < 0.5$ and $-0.3 \leq d < 1$, and Mc may be a metal of Fe, Co, Ni, Zn, or V. For example, in Chemical Formula 4, $0.1 \leq y < 0.5$ or $-0.3 \leq d < 0.5$. For example, in Chemical Formula 4, $0.1 \leq y < 0.4$ or $-0.3 \leq d \leq 0.4$.

For example, the composite transition metal oxide in the cathode active material may be a composite manganese iron oxide expressed by Chemical Formula 5.

$$Mn_{1-y}Fe_yO_{2+d} \quad \text{Chemical Formula 5}$$

wherein $0.05 \leq y < 0.5$ and $-0.3 \leq d < 2$. For example, in Chemical Formula 5, $0.1 \leq y < 0.5$ or $-0.3 \leq d < 1$. For example, in Chemical Formula 5, $0.1 \leq y < 0.4$ or $-0.3 \leq d \leq 0.5$. In the composite manganese iron oxide of Chemical Formula 5, an ionic radius of a $Fe^{3+}$ ion may be about 0.0645 nm and an ionic radius of a $Mn^{4+}$ ion may be about 0.053 nm.

A particle diameter of the composite transition metal oxide in the cathode active material may be about 1 micrometer (μm) or less. When the particle diameter of the composite transition metal oxide is greater than about 1 μm, a discharge capacity per unit weight may be excessively low, and thus, the composite transition metal oxide may be difficult to use as the cathode active material. For example, the particle diameter of the composite transition metal oxide in the cathode active material may be in a range of about 10 nm to about 990 nm. For example, the particle diameter of the composite transition metal oxide in the cathode active material may be in a range of about 10 nm to about 900 nm. For example, the particle diameter of the composite transition metal oxide in the cathode active material may be in a range of about 10 nm to about 500 nm. For example, the particle diameter of the composite transition metal oxide in the cathode active material may be in a range of about 10 nm to about 400 nm.

The composite transition metal oxide in the cathode active material may have a needle shape or a spherical shape, or a combination thereof.

The composite transition metal oxide in the cathode active material may be porous. Since the composite transition metal oxide has pores, the composite transition metal oxide may provide a large reaction area with respect to an electrolyte.

A method of preparing the composite transition metal oxide is not particularly limited, and a solid-phase method or a liquid-phase method may be used.

For example, a metal-containing compound (i.e., metal precursor) having a composition from which the composite transition metal oxide may be formed is mixed in a solution, and precipitates are then recovered by filtration, washed, and dried. Then, the composite transition metal oxide may be prepared by heat treating the precipitates at a temperature ranging from about 200° C. to about 600° C., specifically about 250° C. to about 550° C., or about 300° C. to about 500° C., in an air atmosphere. The solution may selectively include an oxidant or a reducing agent.

For example, a method of preparing a cathode active material for a magnesium secondary battery comprises: preparing a first solution comprising a first precursor of a first Group 5 to 12 metal; preparing a second solution comprising an oxidant and a second precursor of a second Group 5 to 12 metal; combining the first and second solutions to form a precipitate; and heat-treating the precipitate to form the cathode active material. The first and second precursors are independently selected, and may be any suitable compound of the first and second Group 5 to 12 metals, such as a halide, a hydroxide, a carbonate, a nitrate, or an oxalate, or a combination thereof. Use of a chloride is specifically mentioned. For example, the first precursor may be $MnCl_2$, the second precursor may be $FeCl_3$, and the oxidant may be potassium permanganate. For example, each precursor material, e.g., $MnCl_2$ and $FeCl_3$, is weighed to obtain a molar ratio of the first and second Group 5 to 12 metals, e.g., Mn:Fe, of about 0.9:0.1 and precipitates are obtained by mixing the raw materials in a solution. The precipitates are washed and dried, and a composite transition metal oxide having a molar ratio of the first and second Group 5 to 12 metals, e.g., Mn:Fe, of about 0.9:0.1, which is a desirable metal element ratio, may then be prepared by heat treating the precipitates. The ratio of the first and second Group 5 to 12 metals, e.g., Mn:Fe, may be 0.8:0.2 to 0.99:0.1, or 0.9:0.1 to 0.95 to 0.05.

Any suitable precursor compound may be used, such as a precursor compound which may become an oxide in a solution or may become an oxide when decomposed and/or oxidized at a high temperature. $MnCl_2$ or the like may be used as a manganese compound. $FeCl_3$ or the like may be used as an iron compound. However, any suitable Group 5 to 12 metal precursor compound may be used so long as it is available.

An apparatus that has been used industrially, such as a stirrer, may be used for the mixing of the metal-containing compound.

A solvent, which is used for the mixing of the metal-containing compound, may be water or the like. However, the solvent is not necessarily limited thereto, and any suitable solvent may be used so long as it is available in the art. Representative solvents include water, an alcohol (e.g., ethanol, n-propanol, isopropanol, n-butanol, isobutanol, benzyl alcohol), an alkoxy alcohol (e.g., 2-(n-propoxy)ethanol, 2-(n-butoxy)ethanol, or 3-(n-propoxy)ethanol), a ketone (e.g., acetone, methyl ethyl ketone, or methyl n-butyl ketone), a ketonic alcohol (e.g., diacetone alcohol), an ester (e.g., methyl succinate, methyl benzoate, or ethyl propanoate), an acetate (e.g., methyl acetate, ethyl acetate, n-butyl acetate, or t-butyl acetate), or a combination thereof.

An oxidant or a reducing agent may be further added to the mixed solution. For example, $KMnO_4$ may be used. However, any suitable oxidant or a reducing agent material may be used so long as it is available. Representative oxidants may include hydrogen peroxide, sodium hypochlorite, potassium permanganate, or oxygen. Representative reducing agents include ammonia, hydrazine, nitrogen, methyl amine, methane, ethane, and diborane.

The composite transition metal oxide may be obtained by heat treating the precipitates, for example, at a temperature ranging from about 200° C. to about 600° C. for about 0.5 hour to about 10 hours. The heat treatment temperature may be in a range of about 300° C. to about 500° C., for example, about 350° C. to about 450° C.

For example, an atmosphere during the heat treatment may be an inert atmosphere such as nitrogen and argon; an oxidizing atmosphere such as air, oxygen, nitrogen-containing oxygen, or argon-containing oxygen; or a reducing atmosphere such as nitrogen-containing hydrogen, in which about 0.1 volume percent (vol %) to about 10 vol % of hydrogen is contained, or an argon-containing hydrogen in which about 0.1 vol % to about 10 vol % of hydrogen is contained, each based on a total volume of the atmosphere. Sintering may be performed by including an appropriate amount of carbon in a mixture of the metal-containing compound, in order to perform the heat treatment in a strong reducing atmosphere. For example, the heat treatment may be performed in an oxidizing atmosphere such as air.

A cathode according to another embodiment may include the above-described cathode active material.

The cathode, for example, may be prepared as follows:

For example, a cathode active material composition is prepared, in which the above-described composite cathode active material, a conductive agent, a binder, and a solvent are mixed. A cathode plate is prepared by directly coating a metal current collector with the cathode active material composition. Alternatively, the cathode active material composition is cast on a separate support, and a cathode plate may then be prepared by laminating a film detached from the support on the metal current collector. The cathode is not limited to these forms and may have any suitable form.

The cathode may further include an additional cathode active material in addition to the cathode active material including the disclosed composite transition metal oxide.

For example, the additional cathode active material may include an oxide, sulfide, or halide of a metal of scandium, ruthenium, titanium, vanadium, molybdenum, chromium, manganese, iron, cobalt, nickel, copper, zinc, or a combination thereof; or a magnesium composite metal oxide. A combination comprising at least one of the foregoing can be used.

For example, $TiS_2$, $ZrS_2$, $RuO_2$, $Co_3O_4$, $Mo_6S_8$, or $V_2O_5$ may be used. However, the additional cathode active material is not limited thereto. Also, magnesium-based compounds expressed by the formula $Mg(M_{1-x}A_x)O_4$ wherein $0 \leq x \leq 0.5$, M is Ni, Co, Mn, chromium (Cr), V, Fe, copper (Cu), or titanium (Ti), and A is aluminum (Al), boron (B), silicon (Si), Cr, V, carbon (C), sodium (Na), potassium (K), or Mg, may be used as examples of the magnesium composite metal oxide.

As the conductive agent, a combination including a high specific surface area carbon material, such as carbon black, activated carbon, acetylene black, and fine graphite particles, may be used as the conductive agent. Also, electrically conductive fibers, such as fibers prepared by carburizing vapor-grown carbon or pitch, e.g., by-products of petroleum, coal, or coal tar, and carbon fibers prepared from polyacrylonitrile, may be used. Carbon fibers and high specific surface area carbon materials may be simultaneously used. The electrical conductivity may be further improved by simultaneously using the carbon fibers and the high specific surface area carbon materials. Furthermore, a metal-based conductive agent, which is not dissolved by being oxidized in a charge and discharge range of the cathode and has lower electrical resistance than the cathode active material, or other suitable conductive agent may be used. For example, a corrosion-resistant metal such as titanium or gold, a carbide such as SiC or WC, or a nitride such as $Si_3N_4$ or BN may be used. However, the conductive agent is not limited thereto, and any suitable material may be used so long as it is available as a conductive agent in the art.

Examples of the binder may be a vinylidene fluoride/hexafluoropropylene copolymer, polyvinylidene fluoride (PVDF), polyacrylonitrile, poly(methyl (meth)acrylate), polytetrafluoroethylene, a styrene butadiene rubber-based polymer, and a combination thereof. However, the binder is not limited thereto, and any suitable binder may be used.

N-methylpyrrolidone, acetone, or water may be used as the solvent. However, the solvent is not limited thereto, and any suitable solvent may be used.

An electrochemically stable material may be used as the metal current collector without limitations of material, shape, and preparation method. An aluminium foil having a thickness of about 10 μm to about 100 μm, an aluminium perforated foil having a thickness of about 10 μm to about 100 μm and a hole diameter of about 0.1 mm to about 10 mm, expanded metal, and a foam metal plate may be used as the metal current collector. The material of the metal current collector may include stainless and titanium in addition to aluminium.

Amounts of the cathode active material, conductive agent, binder, and solvent may be determined by one of skill in the art without undue experimentation. One or more of the conductive agent, binder, and solvent may be omitted if desired for a particular application or configuration of a magnesium battery.

A magnesium secondary battery according to another embodiment may include the above-described cathode, an anode, and an electrolyte comprising magnesium. The electrolyte may be in a liquid or solid state. An embodiment in which a liquid electrolyte is used, e.g., an organic electrolyte solution, is specifically mentioned. For example, the magnesium battery may be prepared as follows:

First, a cathode may be prepared as described above.

Next, an anode is prepared.

The anode in the magnesium battery may include magnesium metal, a magnesium metal-based alloy, a magnesium intercalating compound, or a carbon-based material. However, the anode is not limited thereto, and any suitable anode material, which includes magnesium or a material which can intercalate/deintercalate magnesium, may be used as long as it is suitable an anode active material.

Because the anode may have a significant effect on the capacity of the magnesium battery, the anode, for example, may be magnesium metal. Examples of the magnesium metal-based alloy may be alloys of magnesium and aluminum, tin, indium, calcium, titanium, vanadium, or a combination thereof.

For example, metallic magnesium having a thickness of about 3 μm to about 500 μm may be used as the anode, and the metallic magnesium having any suitable form, such as a film, sheet, foil, net, porous body, foam, or nonwoven fabric, may be used.

When the magnesium metal and magnesium alloy are used in the anode active material of the magnesium secondary battery, integration of the anode and the battery case may be possible, i.e., in an embodiment in which at least a portion of the battery case is formed of the magnesium metal or the magnesium alloy, which is the anode active material. Thus the portion of the battery case may also be used as the anode. When the battery case is formed of the magnesium metal, handling or safety may be excellent because magnesium metal is relatively inert in air. Therefore, when the battery case may also be used as the anode, a magnesium secondary battery having excellent energy density and power density may be obtained because the weight of the battery may be reduced in comparison to a lithium secondary battery.

When a material other than the magnesium metal or the magnesium alloy is used as the anode active material, a carbon-based material having a graphene structure may be used. A mixed anode of materials such as graphite and graphitized carbon, or a mixed anode of a carbon-based material and metal or an alloy, or a composite anode may be used. Examples of the carbon-based material may be a carbonaceous material, such as natural graphite, artificial graphite, mesophase carbon, expandable graphite, carbon fibers, vapor-grown carbon fibers, a pitch-based carbonaceous material, needle coke, petroleum coke, polyacrylonitrile-based carbon fibers, and carbon black, which may intercalate and deintercalate magnesium ions, or an amorphous-based carbon material which is synthesized by the pyrolysis of five-membered or six-membered cyclic hydrocarbon or a cyclic oxygen-containing organic compound.

In an embodiment wherein the anode active material is in the form of a powder, the anode may be prepared as follows: The anode may be prepared in the same manner as the cathode except that the anode active material is used instead of the composite cathode active material. Also, a conductive agent, a binder, and a solvent in an anode active material composition may be the same as those used in the case of the cathode.

For example, the anode active material composition may be prepared by combining an anode active material, a conductive agent, a binder, and a solvent, and an anode plate may be prepared by directly coating the anode active material composition on a copper current collector. Alternatively, the anode active material composition may be cast on a separate support and an anode plate may then be prepared by laminating an anode active film, which is detached from the support, on the copper current collector.

Any suitable current collector may be used as an anode current collector without limitations of material, shape, and preparation method. For example, a copper foil having a thickness of about 10 μm to about 100 μm, a copper perforated foil having a thickness of about 10 μm to about 100 μm and a hole diameter of about 0.1 mm to about 10 mm, expanded metal, and a foam metal plate may be used as the anode current collector. The material of the anode current collector may include stainless steel, titanium, and nickel in addition to copper.

Amounts of the anode active material, conductive agent, binder, and solvent are at amounts suitable for use in a magnesium battery.

Next, a separator is prepared.

The magnesium battery may further include a separator disposed between the cathode and the anode.

The separator is not limited so long as it may have a composition that may function in an operating environment of the magnesium battery. Examples of the separator may be a polymer non-woven fabric, such as a polypropylene non-woven fabric or a polyphenylene sulfide non-woven fabric, and a porous film of an olefin-based resin, such as polyethylene or polypropylene. Also, a combination thereof may be used as the separator.

Also, a separator having high moisture-retention ability for an electrolyte as well as low resistance to the transfer of electrolyte ions may be used. Examples of the separator may be glass fibers, polyester, Teflon, polytetrafluoroethylene (PTFE), or a combination thereof. The separator may be a nonwoven or woven fabric type.

For example, the separator may be prepared according to the following method:

A separator composition is prepared by combining a polymer resin, a filler, and a solvent. An anode active material layer may be directly coated with the separator composition and then dried to prepare a separator. Also, the separator composition may be cast and dried on a support, and a separator may then be prepared by laminating a separator film detached from the support on the anode active material layer.

The polymer resin used in the preparation of the separator is not limited thereto, and any material used in a binder for an electrode plate may be used. Examples of the polymer resin may be polyethylene, polypropylene, vinylidene fluoride/hexafluoropropylene copolymer, PVDF, polyacrylonitrile, poly(methyl methacrylate), or a combination thereof. Inorganic particles may be used as the filler that is used in the preparation of the separator. Any suitable solvent, which may dissolve the polymer resin and may form pores in the polymer resin during drying, may be used.

Also, the separator may be laminated on the anode active material after the separator is separately prepared. For example, a dry preparation method may be used, in which polypropylene or polyethylene are melted and extruded to be formed as a film, the film is annealed at a low temperature to grow crystal domains, and a microporous membrane is then formed by drawing the film to elongate amorphous regions. For example, a wet preparation method may be used, in which a low molecular weight material, such as a hydrocarbon solvent, and polypropylene or polyethylene are combined to form a film, the solvent or the low molecular weight material are gathered in amorphous phases to form island phases in the film, and a microporous membrane is then formed by removing the solvent or the low molecular weight material using another volatile solvent.

Furthermore, the separator may further contain additives, such as non-conductive particles, other fillers, and fiber compounds, to control strength or hardness and thermal shrinkage. For example, the separator may further include inorganic particles. Since the inorganic particles are further included in the separator, the oxidation resistance of the separator may be improved and the degradation of the battery characteristics may be prevented. The inorganic particles may include alumina ($Al_2O_3$), silica ($SiO_2$), titania ($TiO_2$), or a combination thereof. An average particle diameter of the inorganic particles may be in a range of about 10 nm to about 5 µm. When the average particle diameter is less than about 10 nm, the crystallinity of the inorganic particles may decrease, and thus, an effect of the addition may be insignificant. When the average particle diameter is greater than about 5 µm, the dispersion of the inorganic particles may be difficult.

The separator may have a multilayer structure including one or more polymer layers to increase a tear strength and/or a mechanical strength of the separator. For example, a polyethylene/polypropylene laminate, a polyethylene/polypropylene/polyethylene laminate, or a non-woven fabric/polyolefin laminate may be used as the separator.

Next, an electrolyte solution is prepared.

The electrolyte solution, which is a liquid including magnesium in an ionic state, may be prepared by dissolving a magnesium salt as an electrolyte in a solvent. The solvent may be an organic solvent, water, or a combination thereof. A battery may be formed using an organic electrolyte solution using an organic solvent, or an aqueous electrolyte solution using water in a solvent.

An aqueous electrolyte solution, in which a magnesium salt as an electrolyte is dissolved in water, may be used as the electrolyte solution of the magnesium secondary battery. The aqueous electrolyte solution may be non-flammable.

Since a magnesium secondary battery using the organic electrolyte solution may achieve a battery voltage that is above the decomposition potential of water, the organic electrolyte solution may constitute a magnesium secondary battery having improved power density.

Also, with respect to a magnesium secondary battery using magnesium metal in the anode, a voltage between about 1.1 V and about 1.6 V may be attained in the magnesium battery when using the aqueous electrolyte solution. However, a voltage between about 1.1 V and about 3.0 V may be attained in the magnesium battery when using the organic electrolyte solution.

In the aqueous electrolyte solution, examples of the magnesium salt usable as an electrolyte may be $Mg(OH)_2$, $MgCl_2$, and $Mg(NO_3)_2$. However, the magnesium salt usable as an electrolyte is not limited thereto, and any suitable salt may be used. The salt may be a water-soluble magnesium salt. In an anode using magnesium metal or a magnesium alloy as an anode active material, $Mg(OH)_2$ may be used as the electrolyte in order to prevent the degradation (i.e., oxidation) of the anode. With respect to the aqueous electrolyte solution, a concentration of the electrolyte may be set to be a saturation concentration or a concentration close thereto, in order to increase the conductivity of the aqueous electrolyte solution.

In the organic electrolyte solution, examples of the magnesium salt usable as an electrolyte may be $Mg(BF_4)_2$, $Mg(PF_6)_2$, $Mg(ClO_4)_2$, $Mg(CF_3SO_3)_2$, and $Mg(AsF_6)_2$.

An aprotic organic solvent may be used as an organic solvent in the organic electrolyte solution. For example, the organic electrolyte solution for a magnesium secondary battery may include an organic solvent such as dimethyl ether, diethyl ether, dimethyl carbonate, diethyl carbonate, ethylmethyl carbonate, dipropyl carbonate, methylpropyl carbonate, ethylpropyl carbonate, ethylene carbonate, propylene carbonate, butylene carbonate, methyl acetate, ethyl acetate, n-propyl acetate, dimethyl acetate, methyl propionate, ethyl propionate, γ-butyrolactone, decanolide, valerolactone, mevalonolactone, or caprolactone, dibutyl ether, tetraglyme, diglyme, polyethylene glycol dimethyl ether, dimethoxyethane, 2-methyltetrahydrofuran, 2,2-dimethyltetrahydrofuran, 2,5-dimethyltetrahydrofuran, cyclohexanone, triethylamine, triphenylamine, triethylphosphine oxide, acetonitrile, dimethylformamide, 1,3-dioxolane, sulfolane, or a combination thereof. However, the solvent is not limited thereto, and any suitable organic solvent may be used.

The concentration of the electrolyte in the organic electrolyte solution may be in a range of about 0.001 molar (M) to about 10 M, specifically 0.01 M to about 5 M, more specifically 0.1 M to about 2 M. When the concentration of the electrolyte is low, the conductivity may decrease. When the concentration of the electrolyte is high, viscosity may excessively increase, and thus, low-temperature characteristics may degrade. The electrolyte solution may further include a flame retardant such as phosphate ester or a phosphite ester.

Representative solid state electrolytes include $Mg(BH_4)(NH_2)$.

Figure 5:
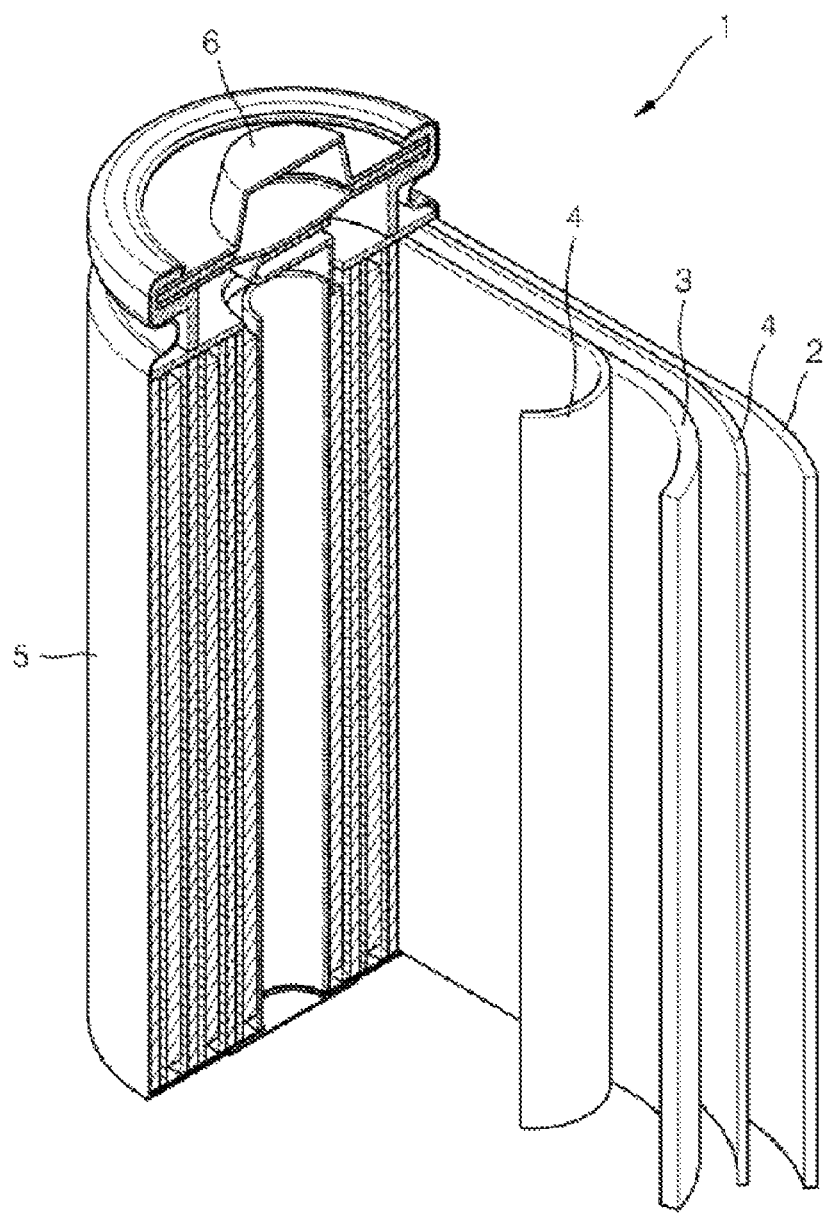
FIG. 5 is a schematic view illustrating an embodiment of a magnesium battery.

As shown in FIG. 5, a magnesium secondary battery 1 includes a cathode 3, an anode 2, and a separator 4. The cathode 3, the anode 2, and the separator 4 are wound and folded to be contained in a battery case 5. Subsequently, an organic electrolyte solution is disposed, e.g., injected, into the battery case 5, and the magnesium secondary battery 1 is completed by being sealed with a cap assembly 6.

The battery case 5 may be a cylindrical, rectangular, or thin-film type battery case. For example, the magnesium secondary battery 1 may be a large thin-film type battery. The magnesium secondary battery 1 may be a magnesium-ion battery.

A separator is disposed between the cathode 3 and the anode 2 such that a battery structure may be formed. The battery structure may be wound, folded, or stacked in a bi-cell structure, and then impregnated in an organic electrolyte solution. A magnesium polymer battery is completed when a product thus obtained is contained in a pouch and sealed.

Also, battery structures may be stacked to form a battery pack, and the battery pack may be used in all devices demanding high capacity. For example, the battery pack may be used in a notebook, a smartphone, or an electric vehicle (EV).

Further, since the magnesium battery has excellent storage stability and thermal stability, it may be used in an energy storage system (ESS) or an EV. For example, the magnesium battery may be used in a hybrid vehicle, such as a plug-in hybrid electric vehicle (PHEV).

The present disclosure will be described in more detail according to examples and comparative examples. However, the examples are exemplary, and the scope of the present disclosure is not limited thereto.

PREPARATION OF CATHODE ACTIVE MATERIAL

Example 1

$MnCl_2$, $FeCl_3$, and $KMnO_4$ were weighed at a selected molar ratio of 0.35:0.2:0.05, and the $MnCl_2$ was then added to deionized water and stirred for about 3 hours to prepare a first solution. Separately, the $FeCl_3$ and $KMnO_4$ were added to deionized water and stirred for about 3 hours to prepare a second solution. The first solution and the second solution were mixed by adding the first solution to the second solution while stirring. The first solution and the second solution were sufficiently mixed and precipitates were then recovered by filtration, and washed with water and ethanol. Then, the precipitates were dried at about 80° C. for about 12 hours in a convection oven. The dried product thus obtained was put in an alumina boat, and a composite transition metal oxide was prepared by heat treating the dried product at about 400° C. for about 3 hours in an air atmosphere.

The composite transition metal oxide thus prepared was $Mn_{0.76}Fe_{0.16}O_{1.76}$.

Example 2

A composite transition metal oxide was prepared in the same manner as in Example 1 except that the molar ratio of $MnCl_2$, $FeCl_3$, and $KMnO_4$ were changed to 0.15:0.2:0.05.

The composite transition metal oxide thus prepared was $Mn_{0.79}Fe_{0.21}O_{1.89}$.

Example 3

A composite transition metal oxide was prepared in the same manner as in Example 1 except that the molar ratio of $MnCl_2$, $FeCl_3$, and $KMnO_4$ were changed to 0.05:0.2:0.05.

The composite transition metal oxide thus prepared was $Mn_{0.65}Fe_{0.34}O_{1.81}$.

Example 4

A composite transition metal oxide was prepared in the same manner as in Example 1 except that $NiCl_2$ was used instead of $FeCl_3$.

The composite transition metal oxide thus prepared was $Mn_{0.9}Ni_{0.1}O_2$.

Example 5

A composite transition metal oxide was prepared in the same manner as in Example 1 except that $CuCl_2$ was used instead of $FeCl_3$.

The composite transition metal oxide thus prepared was $Mn_{0.9}Cu_{0.1}O_2$.

Comparative Example 1

$MnCl_2$ and $KMnO_4$ were weighed at a predetermined molar ratio of 0.15:0.05, and the $MnCl_2$ was then added to deionized water and stirred for about 3 hours to prepare a first solution. Also, the $KMnO_4$ were added to deionized water and stirred for about 3 hours to prepare a second solution. The first solution and the second solution were mixed by adding the first solution to the second solution while stirring. The first solution and the second solution were sufficiently mixed and precipitates were then recovered by filtration and washed with water and ethanol. Then, the precipitates were dried at about 80° C. for about 12 hours in a convection oven. The dried product thus obtained was put in an alumina boat, and a composite transition metal oxide was prepared by heat treating the dried product at about 400° C. for about 3 hours in an air atmosphere.

The composite transition metal oxide thus prepared was $MnO_2$.

Comparative Example 2

A composite transition metal oxide was prepared in the same manner as in Example 1 except that the molar ratio of $MnCl_2$, $Cl_3$, and $KMnO_4$ were changed.

The composite transition metal oxide thus prepared was $Mn_{0.7}Fe_{0.02}O_2$.

Preparation of Magnesium Battery System

Example 6

The composite cathode active material prepared in Example 1, Denka black as a conductive agent, and polyvinylidene fluoride (PVDF) at a weight ratio of about 76:9:15 were added to N-methylpyrrolidone (NMP) and mixed to prepare a cathode active material slurry. An about 15 μm thick aluminum current collector was coated with the slurry by bar coating and dried at room temperature. Then, the current collector thus obtained was again dried at about 120° C. for about 2 hours in vacuum. A cathode plate was prepared by cutting the dried current collector thus obtained into a circle having a diameter of about 12 mm.

The cathode plate was disposed in a Teflon container, and a three-electrode system was formed using an about 100 μm thick magnesium foil as a counter electrode, a $Ag/AgNO_3$ electrode as a reference electrode, and an organic electrolyte solution, in which about 0.5 M $Mg(ClO_4)_2$ was dissolved in propylene carbonate (PC) as an electrolyte. The Teflon container contained an argon atmosphere and was sealed to block air ingress.

Examples 7 to 10

Magnesium batteries were prepared in the same manner as in Example 6 except that the cathode active materials prepared in Examples 2 to 5 were respectively used.

Comparative Examples 3 and 4

Magnesium batteries were prepared in the same manner as in Example 6 except that the cathode active materials prepared in Comparative Examples 1 and 2 were respectively used.

Evaluation Example 1

Scanning Electron Microscope (SEM) Analysis

SEM micrographs were obtained from the cathode active materials prepared in Examples 1 to 3 and Comparative Example 1. The results thereof are presented in FIGS. 1A to 1D. As illustrated in FIGS. 1A to 1D, the cathode active materials of Examples 1 to 3 had a needle shape or a spherical shape and were porous.

An average particle diameter of the cathode active material of Example 1 was about 300 nm. An average particle diameter of the cathode active material of Example 2 was about 250 nm. An average particle diameter of the cathode active material of Example 3 was about 15 nm.

Evaluation Example 2

X-ray Diffraction (XRD) Analysis

XRD analyses were respectively performed on the cathode active materials prepared in Examples 1 to 3 and Comparative Example 1. The results thereof are presented in FIG. 2.

As illustrated in FIG. 2, intensities of characteristic peaks of the cathode active materials prepared in Examples 1 to 3 were lower than that of the cathode active material prepared in Comparative Example 1. In particular, the cathode active material of Example 3 exhibited peaks close to those of an amorphous material. Therefore, it was confirmed that the crystallinities of the cathode active materials of Examples 1 to 3 were lower than that of the cathode active material prepared in Comparative Example 1.

Also, the characteristic peaks of the cathode active materials prepared in Examples 1 to 3 were shifted about 2 degrees toward a lower angle in comparison to the characteristic peaks of the cathode active material of Comparative Example 1.

Evaluation Example 3

X-ray Photoelectron Spectroscopy (XPS) Analysis

XPS analyses were respectively performed on surfaces of the cathode prepared in Example 6 before charge and discharge, after the charge, and after the discharge. The results thereof are presented in FIGS. 3A and 3B.

Figure 3A:
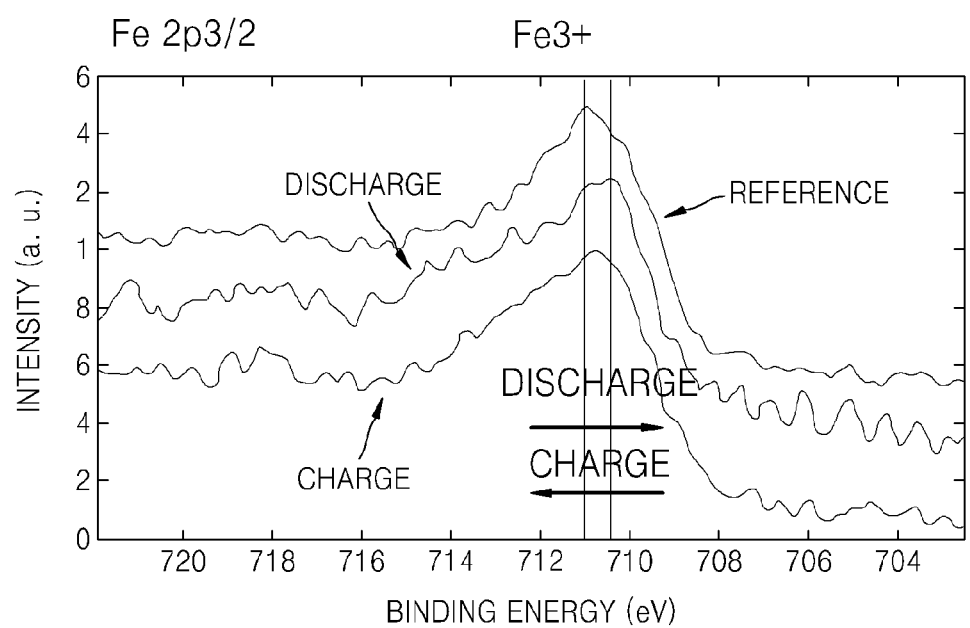
FIGS. 3A and 3B are graphs of intensity (arbitrary units) versus binding energy (electron volts, eV) showing X-ray photoelectron spectroscopy (XPS) spectra illustrating the changes in surface concentrations of iron and manganese, respectively, of a cathode prepared in Example 6 according to oxidation/reduction of a cathode active material during charge and discharge.

As illustrated in FIG. 3A, a reference peak corresponding to a binding energy of the Fe $2p_{3/2}$ orbital was present near 711 eV, an intensity of a charge peak corresponding to $Fe^{3+}$ was increased during the charge, and an intensity of a discharge peak corresponding to $Fe^{(3-\delta)+}$ was increased due to reduction during the discharge.

Figure 3B:
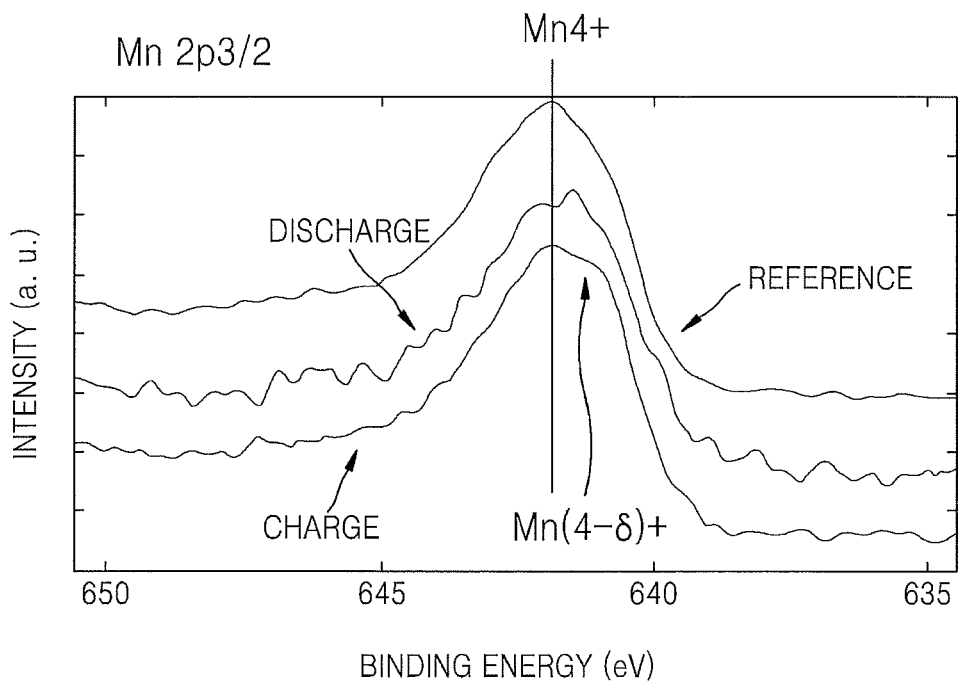

As illustrated in FIG. 3B, a reference peak corresponding to a binding energy of the Mn $2p_{3/2}$ orbital was present near 642 eV, an intensity of a charge peak corresponding to $Mn^{4+}$ was increased during the charge, and an intensity of a discharge peak corresponding to $Mn^{(4-\delta)+}$ was increased due to reduction during the discharge.

It may be understood that $Fe^{3+}$ and $Mn^{4+}$ were simultaneously involved in an electrochemical reaction during the charge and discharge.

Evaluation Example 4

Lifetime Characteristic Evaluation

Figure 4:
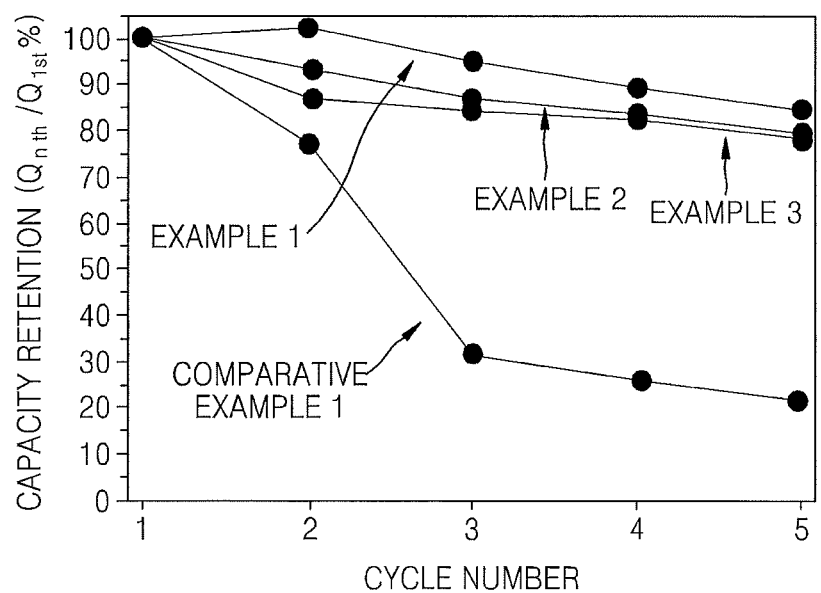
FIG. 4 is a graph of normalized capacity retention (capacity/capacity of a $1^{st}$ cycle) versus cycle number illustrating lifetime characteristics of magnesium batteries prepared in Examples 6 to 8 and Comparative Example 3.

The magnesium batteries prepared in Examples 6 to 10 and Comparative Examples 3 and 4 were charged and discharged up to 5 cycles at a constant current of about 15 milliampere-hours per gram (mA/g) in a voltage range of about −2.0 V to about 1.0 V with respect to a Ag/Ag$^+$ reference electrode at room temperature, and some of the results thereof are presented in Table 1 and FIG. 4. A capacity retention ratio in a $5^{th}$ cycle is expressed by Equation 1.

Capacity retention ratio in the $5^{th}$ cycle [%]=(discharge capacity in a $5^{th}$ cycle/discharge capacity in the $1^{st}$ cycle)×100%     Equation 1

TABLE 1

| | Capacity retention ratio in the $5^{th}$ cycle [%] |
|---|---|
| Example 6 | 84 |
| Example 7 | 81 |
| Example 8 | 80 |
| Comparative Example 3 | 21 |

As illustrated in FIG. 4, in which Q is the capacity (milliampere-hours), the magnesium batteries of Examples 6 to 8 exhibited improved lifetime characteristics in comparison to the magnesium battery of Comparative Examples 3. Also, the magnesium battery of Comparative Example 4 exhibited a capacity retention ratio similar to the capacity retention ratio of the magnesium battery of Comparative Example 3.

As described above, according to disclosed embodiments, lifetime characteristics of a magnesium battery may be improved by using a cathode active material for a magnesium battery which is substituted with a transition metal.

It should be understood that the exemplary embodiments described therein should be considered in a descriptive sense only and not for purposes of limitation. Descriptions of features, advantages, or aspects within each embodiment should be considered as available for other similar features, advantages, or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A magnesium secondary battery comprising,
a cathode comprising a cathode active material;
an anode; and
an electrolyte comprising magnesium,
wherein the cathode active material comprises a composite transition metal oxide which is expressed by Chemical Formula 1 and intercalates and deintercalates magnesium:

$Mg_xMa_{1-y}Mb_yO_{2+d}$     Chemical Formula 1 wherein 0≤x≤1, 0.05≤y<0.5, and −0.3≤d<1, and
Ma and Mb are each independently a metal selected from the group consisting of Groups 5 to 12 of the Periodic Table.

2. The magnesium secondary battery of claim 1, wherein an ionic radius of an Ma$^{+4}$ ion is smaller than an ionic radius of an Mb$^{+3}$ ion.

3. The magnesium secondary battery of claim 1, wherein an ionic radius of an Ma$^{+4}$ ion is in a range of about 0.050 nanometers to about 0.060 nanometers.

4. The magnesium secondary battery of claim 1, wherein the Ma and the Mb are each independently oxidized or reduced during charge and discharge.

5. The magnesium secondary battery of claim 1, wherein at least a portion of the composite transition metal oxide has a pyrolusite-type crystal structure.

6. The magnesium secondary battery of claim 1, wherein the composite transition metal oxide has a degree of crystallinity which is less than a degree of crystallinity of a transition metal oxide which is not substituted with Mb.

7. The magnesium secondary battery of claim 1, wherein the composite transition metal oxide is expressed by Chemical Formula 2:

$$Mg_xMn_{1-y}Mb_yO_{2+d} \qquad \text{Chemical Formula 2}$$

wherein $0 \leq x \leq 1$, $0.05 \leq y < 0.5$, and $-0.3 \leq d < 1$, and
Mb is a metal of Groups 5 to 12 of the Periodic Table other than manganese (Mn).

8. The magnesium secondary battery of claim 7, wherein $0.1 \leq y < 0.5$ and $-0.3 \leq d < 0.5$.

9. The magnesium secondary battery of claim 1, wherein the composite transition metal oxide is expressed by Chemical Formula 3:

$$Mg_xMn_{1-y}Mc_yO_{2+d} \qquad \text{Chemical Formula 3}$$

wherein $0 \leq x \leq 1$, $0.05 \leq y < 0.5$, and $0.3 \leq d < 1$, and
Mc is iron (Fe), cobalt (Co), nickel (Ni), zinc (Zn), or vanadium (V).

10. The magnesium secondary battery of claim 9, wherein $0.1 \leq y < 0.5$ and $-0.3 \leq d < 0.5$.

11. The magnesium secondary battery of claim 1, wherein the composite transition metal oxide is expressed by Chemical Formula 4:

$$Mn_{1-y}Mc_yO_{2+d} \qquad \text{Chemical Formula 4}$$

wherein $0.05 \leq y < 0.5$ and $-0.3 \leq d < 1$, and
Mc is Fe, Co, Ni, Zn, or V.

12. The magnesium secondary battery of claim 11, wherein $0.1 \leq y < 0.5$ and $-0.3 \leq d < 0.5$.

13. The magnesium secondary battery of claim 1, wherein a particle diameter of the composite transition metal oxide is about 1 μm or less.

14. The magnesium secondary battery of claim 1, wherein a particle diameter of the composite transition metal oxide is in a range of about 10 nanometers to about 990 nanometers.

15. The magnesium secondary battery of claim 1, wherein the composite transition metal oxide has a needle shape or a spherical shape.

16. The magnesium secondary battery of claim 1, wherein the composite transition metal oxide is porous.

17. The magnesium secondary battery of claim 1, wherein the anode comprises magnesium metal, a magnesium metal alloy, a magnesium intercalation compound, or a carbonaceous material.

18. The magnesium secondary battery of claim 1 further comprising a separator disposed between the cathode and the anode.

* * * * *